United States Patent
Tachiiwa

(10) Patent No.: US 11,620,911 B2
(45) Date of Patent: Apr. 4, 2023

(54) MANAGEMENT DEVICE AND FLYING DEVICE MANAGEMENT METHOD

(71) Applicant: KDDI CORPORATION, Tokyo (JP)

(72) Inventor: Masayuki Tachiiwa, Tokyo (JP)

(73) Assignee: KDDI Corporation, Tokyo (JP)

( * ) Notice: Subject to any disclaimer, the term of this patent is extended or adjusted under 35 U.S.C. 154(b) by 144 days.

(21) Appl. No.: 16/976,173

(22) PCT Filed: Feb. 20, 2019

(86) PCT No.: PCT/JP2019/006262
§ 371 (c)(1),
(2) Date: Aug. 27, 2020

(87) PCT Pub. No.: WO2019/181338
PCT Pub. Date: Sep. 26, 2019

(65) Prior Publication Data
US 2020/0410873 A1    Dec. 31, 2020

(30) Foreign Application Priority Data

Mar. 19, 2018    (JP) .............................. JP2018-051727

(51) Int. Cl.
*G08G 5/00* (2006.01)
*H04N 7/18* (2006.01)
(Continued)

(52) U.S. Cl.
CPC ........... *G08G 5/0034* (2013.01); *B64C 39/02* (2013.01); *B64D 27/24* (2013.01); *B64D 47/08* (2013.01);
(Continued)

(58) Field of Classification Search
CPC .... G08G 5/0034; G08G 5/0069; B64C 39/02; B64D 27/24; B64D 47/08; G05D 1/0094;
(Continued)

(56) References Cited

U.S. PATENT DOCUMENTS

2017/0010615 A1    1/2017  Tanaka
2019/0196456 A1*   6/2019  Oh ..................... G05B 19/4186

FOREIGN PATENT DOCUMENTS

JP    2006-027331 A    2/2006
JP    2017-174110 A    9/2017
(Continued)

OTHER PUBLICATIONS

International Search Report issued in corresponding application No. PCT/JP2019/006262 dated Mar. 19, 2019 with English translation.
(Continued)

*Primary Examiner* — Peter D Nolan
*Assistant Examiner* — Demetra R Smith-Stewart
(74) *Attorney, Agent, or Firm* — Foley & Lardner LLP

(57) ABSTRACT

A management device includes a route determination unit configured to determine a photography route, an instruction unit configured to instruct a first flying device to perform photography on the photography route, and an identification unit configured to identify a stop position of the photography by the first flying device. When the identification unit has identified the stop position, the instruction unit is configured to instruct a second flying device, which is different from the first flying device, to start the photography on the photography route from the stop position.

11 Claims, 5 Drawing Sheets

(51) Int. Cl.
  *B64D 47/08* (2006.01)
  *B64D 39/02* (2006.01)
  *B64C 39/02* (2023.01)
  *B64D 27/24* (2006.01)
  *G05D 1/00* (2006.01)
  *G05D 1/10* (2006.01)

(52) U.S. Cl.
  CPC ........... *G05D 1/0094* (2013.01); *G05D 1/101* (2013.01); *G08G 5/0069* (2013.01); *H04N 7/185* (2013.01); *G05D 2201/0207* (2013.01)

(58) Field of Classification Search
  CPC . G05D 1/101; G05D 2201/0207; H04N 7/185
  See application file for complete search history.

(56) References Cited

FOREIGN PATENT DOCUMENTS

| | | | |
|---|---|---|---|
| JP | 2018073173 A | * | 5/2018 |
| KR | 10-2017-0065925 | | 6/2017 |
| WO | WO-2015/163106 A1 | | 10/2015 |

OTHER PUBLICATIONS

Notice of Reasons for Rejection issued in corresponding Japanese Application No. 2022-048487, dated Jul. 5, 2022 with English translation (6 pages).

* cited by examiner

MANAGEMENT DEVICE AND FLYING DEVICE MANAGEMENT METHOD

TECHNICAL FIELD

The present invention relates to a management device and a flying device management method for determining a route of photography by a flying device.

Priority is claimed on Japanese Patent Application No. 2018-51727, filed Mar. 19, 2018, the content of which is incorporated herein by reference.

BACKGROUND ART

Conventionally, it is known that there is a technology for causing a flying device to fly around a facility such as a bridge, a tunnel, a road, or a plant and to perform photography, inspection, and monitoring (hereinafter referred to as photography and the like) of a state of the facility (for example, see Patent Document 1).

PRIOR ART DOCUMENTS

Patent Document

[Patent Document 1]
PCT International Publication No. WO2015/163106

SUMMARY OF INVENTION

Problems to be Solved by the Invention

When photography and the like of a facility such as a long road or a large factory are desired to be performed using a flying device, there is a problem that it may not be possible to complete the photography and the like if the battery power does not remain before the photography and the like are completed.

The present invention has been made in view of these points and an objective of the present invention is to enable photography and the like of a wider area using a flying device.

Means for Solving the Problems

According to a first aspect of the present invention, a management device is provided, the management device including: a route determination unit configured to determine a photography route; an instruction unit configured to instruct a first flying device to perform photography on the photography route; and an identification unit configured to identify a stop position of the photography by the first flying device, wherein, when the identification unit has identified the stop position, the instruction unit is configured to instruct a second flying device, which is different from the first flying device, to start the photography on the photography route from the stop position.

The identification unit may identify the stop position on the basis of stop position information representing the stop position acquired from the first flying device that has stopped the photography. The identification unit may acquire flight position information representing a position of the first flying device at predetermined time intervals and identify a position within a predetermined range from a position represented by the flight position information that has been acquired last as the stop position when the flight position information cannot be acquired for a predetermined time period or longer. The identification unit may estimate a time at which the first flying device will stop the photography and the instruction unit may instruct the second flying device to start the photography before the time estimated by the identification unit.

The instruction unit may determine a departure time required for the second flying device to reach a flight position of the first flying device before the time estimated by the identification unit on the basis of a distance from a position of the second flying device to the flight position of the first flying device and notify the second flying device of the determined departure time.

The identification unit may acquire the remaining amount of battery power of the first flying device and estimate a time at which the first flying device will stop the photography on the basis of electric power required for the first flying device to return to a predetermined position and the remaining amount of battery power. The identification unit may acquire the remaining amount of battery power of the first flying device. When it is determined that the first flying device is allowed to end the photography on the basis of electric power required for the first flying device to return to a predetermined position and the remaining amount of battery power, the instruction unit may instruct the first flying device to end the photography and instructs the second flying device to start the photography.

The identification unit may acquire state information representing a state of the first flying device and identify a flight position of the first flying device at a point in time at which the state information is determined to represent a failure of the first flying device as the stop position. When the identification unit determines that the state information represents the failure of the first flying device, the instruction unit may instruct the first flying device to stop the photography and instruct the second flying device to start the photography.

The identification unit may identify the stop position by acquiring a scheduled stop position, which is a position where the first flying device is scheduled to end the photography, from the first flying device and the instruction unit may instruct the second flying device to start the photography from the scheduled stop position when the identification unit has acquired the scheduled stop position. The route determination unit may determine the photography route on the basis of externally acquired disaster information.

According to a second aspect of the present invention, a flying device management method is provided, the flying device management method including steps of: determining, by a computer, a photography route; instructing, by the computer, a first flying device to perform photography on the photography route; identifying, by the computer, a stop position of the photography by the first flying device; and instructing, by the computer, a second flying device, which is different from the first flying device, to start the photography on the photography route from the stop position when the stop position has been identified.

Advantageous Effects of the Invention

According to the present invention, there is an advantageous effect in that it is possible to enable photography and the like of a wider area using a flying device.

EMBODIMENTS FOR CARRYING OUT THE INVENTION

First Embodiment

[Outline of Photography System S]

Figure 1:
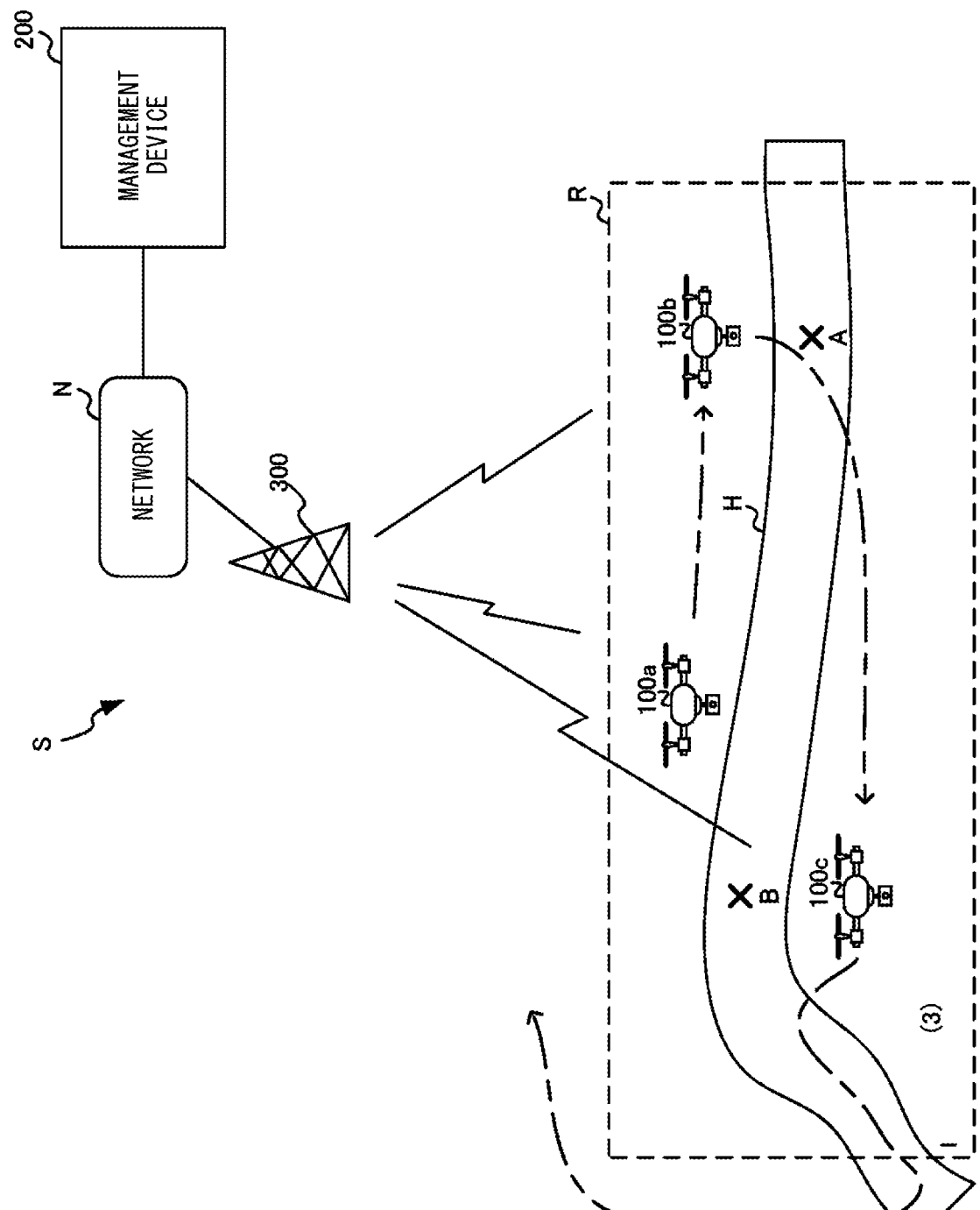
FIG. 1 is a diagram showing a configuration of a photography system according to a first embodiment.

FIG. 1 is a diagram showing a configuration of a photography system S according to a first embodiment. The photography system S is a system for photographing a relatively large facility such as a road H. The photography system S includes a plurality of flying devices 100a, 100b and 100c and a management device 200. The flying devices 100a, 100b, and 100c are devices capable of flying in the air and are, for example, drones. In the following description, when a configuration or an operation common to the flying devices 100a, 100b, and 100c is described, they may be referred to as flying devices 100.

The flying device 100 communicates with the management device 200 via a base station 300 that constitutes a network N such as a portable phone network. The flying device 100 generates a captured image within an inspection range R of the road H during a flight using amounted camera. The flying device 100 transmits the generated captured image to the management device 200 in association with position information representing a flight position.

When the flying device 100 stops photography due to a lack of the remaining amount of battery power, a failure, or the like, the flying device 100 transmits a stop notification representing that the photography has been stopped to the management device 200. Also, when the photography is scheduled to be stopped, the flying device 100 transmits a stop notification representing that the photography is scheduled to be stopped to the management device 200. The flying device 100 transmits stop position information representing a position where the photography has been stopped to the management device 200 in association with the stop notification.

The management device 200 is a server for managing a flight situation of the flying device 100. The management device 200 determines a photography route for the first flying device 100a to photograph the inspection range R of the road H. The inspection range R is a partial area of the road H and is a range required to be inspected by photographing the road H. The management device 200 instructs the first flying device 100a to perform the photography on the determined photography route. In FIG. 1, an example of the photography route is represented by a dashed-dotted arrow extending from the flying devices 100a, 100b, and 100c.

The first flying device 100a photographs the road H while flying along the photography route according to an instruction from the management device 200. In the example of FIG. 1, it is assumed that the photography of the road H has stopped due to a lack of the remaining amount of battery power at a point in time when the first flying device 100a has reached a point A. The first flying device 100a returns to a standby position (for example, a drone port) where the flying device 100 is on standby after transmitting a stop notification representing that the photography has been stopped to the management device 200. When the stop notification is received, the management device 200 identifies a position (which may also be hereinafter referred to as a stop position) at which the first flying device 100a has stopped the photography on the basis of stop position information received in association with the stop notification. The management device 200 instructs the second flying device 100b, which is different from the first flying device 100a, to start the photography on the photography route from the position where the first flying device 100a has stopped the photography.

The second flying device 100b starts the photography along the photography route from the point A, which is the position where the first flying device 100a has stopped the photography. It is assumed that the second flying device 100b has stopped the photography of the road H at a point in time when the second flying device 100b has reached a point B due to a lack of the remaining amount of batter power. The second flying device 100b returns to the standby position after transmitting a stop notification to the management device 200 as in the case of the first flying device 100a. The management device 200 identifies the position where the second flying device 100b has stopped the photography and instructs the third flying device 100c to start the photography on the photography route from the position where the second flying device 100b has stopped the photography. The third flying device 100c flies along the photography route from the point B where the second flying device 100b has stopped the photography. After the third flying device 100c completes the photography of the remaining section from the point B, the third flying device 100c returns to the standby position.

According to this configuration, when movement of a distance longer than a flight range of the single flying device 100 is required in the photography of the inspection range R on the road H, the management device 200 can cause the flying devices 100a, 100b, and 100c to sequentially photograph the road H. Thus, the management device 200 can use the flying devices 100a, 100b, and 100c to enable photography of an area that cannot be photographed by one flying device 100.

[Configuration of Flying Device 100]

Figure 2:
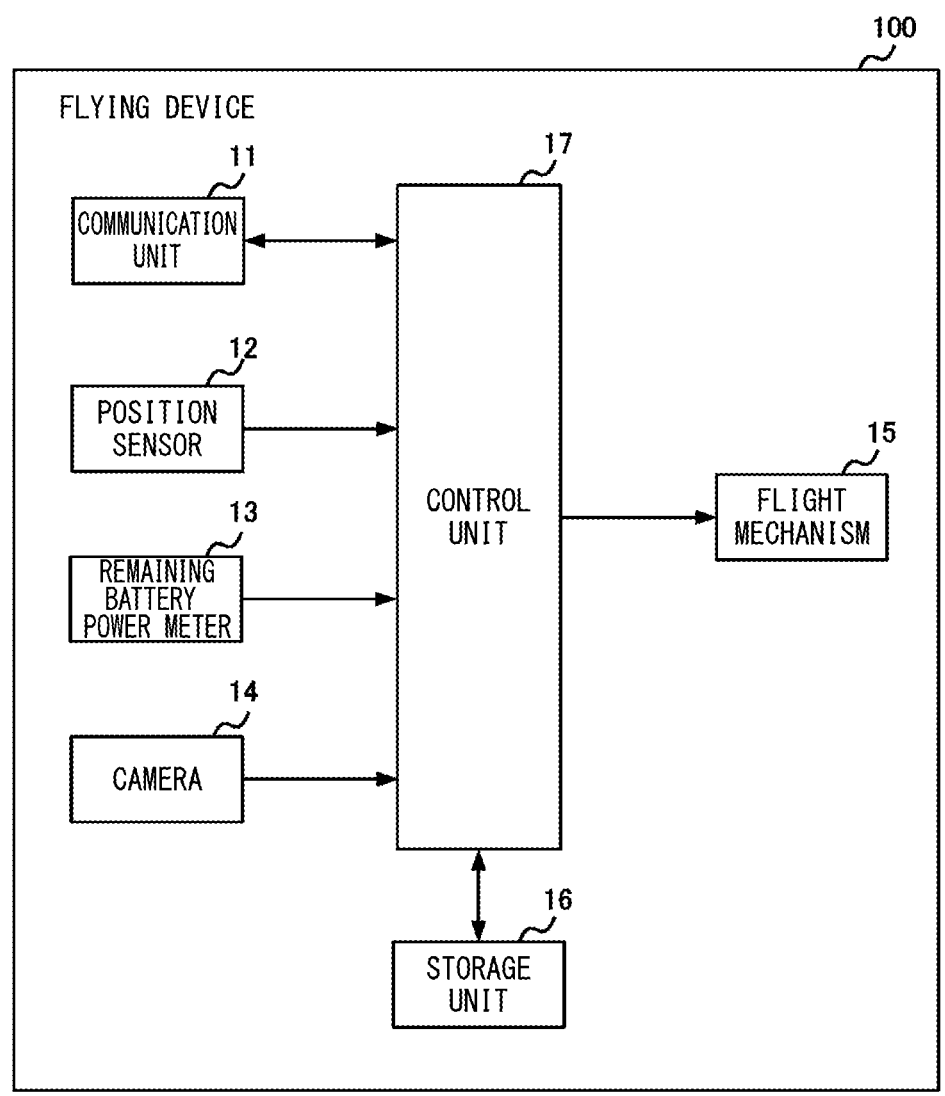
FIG. 2 is a block diagram showing a configuration of a flying device according to the embodiment.

FIG. 2 is a diagram showing a configuration of the flying device 100. The flying device 100 includes a communication unit 11, a position sensor 12, a remaining battery power meter 13, a camera 14, a flight mechanism 15, a storage unit 16, and a control unit 17. The communication unit 11 is a wireless communication module for communicating with the management device 200 via the base station 300 and the network N. The position sensor 12 acquires a position of its own flying device 100 (which may be hereinafter referred to as its own device) in flight (the flying device 100 equipped with the position sensor 12). For example, the position sensor 12 is a GPS sensor that acquires a GPS signal. The position sensor 12 may further include an altitude sensor to acquire a position of its own device during a flight including a flight altitude.

The remaining battery power meter 13 measures the remaining amount of power of a battery mounted on the flying device 100. For example, the remaining battery power meter 13 measures the remaining amount of battery power by measuring a terminal voltage of the battery mounted on the flying device 100. The camera 14 generates a captured image of the road H. The flight mechanism 15 includes a propeller, a motor that rotates the propeller, a rudder, and the like. The flight mechanism 15 causes these mechanisms to be operated on the basis of control of the control unit 17. The storage unit 16 is a storage medium including a read only memory (ROM) and a random access memory (RAM). The storage unit 16 stores a program to be executed by the control unit 17.

The control unit 17 is, for example, a central processing unit (CPU). The control unit 17 executes various functions by executing the program stored in the storage unit 16. The control unit 17 acquires photography route information representing a photography route from the management device 200 via the communication unit 11.

The control unit 17 controls the flight mechanism 15 so that the flying device 100 flies along the acquired photography route. In addition to the photography route information, the control unit 17 may acquire information for identifying a direction of the camera 14 at a plurality of flight positions on the photography route or a position of an object to be photographed. The object to be photographed is, for example, a pillar of the road H.

The control unit 17 first moves from a predetermined standby position for the flying device 100 which is on standby to a position where the photography will be started and starts the photography of the road H with the camera 14. The control unit 17 photographs the road H with the camera 14 while moving along the photography route. At this time, the control unit 17 may fly along a traveling direction of the road or may fly over the road H in a zigzag manner.

When the road H is an elevated road, a flight may be performed so that a bottom or a pillar of the road H may be photographed from a lower part or a side part of the road H. For example, the control unit 17 controls the flight mechanism 15 so that the flight is performed along the photography route by a flight method indicated from the management device 200.

The control unit 17 acquires a position of the flying device 100 through the position sensor 12 when the camera 14 performs the photography. The control unit 17 causes a captured image generated by the camera 14 and photography position information representing a position of its own device at the time of the photography to be stored in the storage unit 16 in a state in which the captured image and the photography position information are associated. The control unit 17 may transmit the captured image and the photography position information, which are associated with each other, to the management device 200.

The control unit 17 acquires the remaining amount of battery power measured by the remaining battery power meter 13. The control unit 17 transmits information representing the acquired remaining amount of battery power to the management device 200. The control unit 17 determines whether or not the photography is to be stopped, for example, on the basis of the photography route received from the management device 200 and the remaining amount of battery power acquired from the remaining battery power meter 13. The control unit 17 determines whether or not battery power, which enables the photography of the road H to be continued, remains in a state in which electric power necessary for returning to a standby place is ensured. When it is determined that the battery power, which enables the photography of the road H to be continued, does not remain in a state in which electric power necessary for returning to a standby place is ensured, the control unit 17 stops the photography. On the other hand, when it is determined that the battery power, which enables the photography of the road H to be continued, remains in a state in which electric power necessary for returning to a standby place is ensured, the control unit 17 does not stop the photography.

Also, the control unit 17 may stop the photography when it is determined that the flying device 100 has failed. For example, the control unit 17 stops the photography in the following cases (1) to (3).

(1) When a temperature sensor, a wind speed sensor, a rain sensor, or a snow sensor (not shown) mounted on the flying device 100 detects that an outside air environment exceeds a predetermined standard, the control unit 17 stops the photography.

The predetermined standard is, for example, a value defined by the standard of the flying device 100 as a condition in which the flying device 100 can fly.

(2) When it is determined that the flying device 100, which is not equipped with a wind speed sensor, has deviated from the photography route for a predetermined time period or a predetermined number of times due to wind force, the control unit 17 stops the photography.

Those skilled in the art can set the predetermined time period or the predetermined number of times as a value representing a state in which a safe flight is difficult due to wind force.

(3) When it is determined that one or more of a plurality of propellers mounted on the flying device 100 have not rotated, the control unit 17 stops the photography.

When the photography has been stopped, the control unit 17 transmits a stop notification representing that the photography has been stopped to the management device 200. The control unit 17 acquires a position of its own device at the time of stopping of the photography through the position sensor 12 and transmits the acquired position as stop position information to the management device 200. At this time, the control unit 17 transmits the stop notification and the stop position information, which are associated with each other, to the management device 200.

The control unit 17 may identify a scheduled stop position, which is a position where the photography is scheduled to end, in advance and may transmit the identified scheduled stop position to the management device 200. The control unit 17 identifies the scheduled stop position, for example, on the basis of the photography route received from the management device 200 and the remaining amount of battery power acquired from the remaining battery power meter 13. First, the control unit 17 calculates a flight distance for which the photography of the road H can be continued in a state in which electric power necessary for returning to a standby place is ensured. Subsequently, the control unit 17 identifies a position along the photography route after movement by the calculated flight distance as the scheduled stop position. When photography is scheduled to be stopped, the control unit 17 transmits a stop notification representing that the photography is scheduled to be stopped and including the scheduled stop position to the management device 200. The control unit 17 ends the photography when the scheduled stop position has been reached and returns to a predetermined standby position.

The control unit 17 may transmit state information representing a state of the flying device 100 to the management device 200. For example, the state information is used for the management device 200 side to determine whether or not the flying device 100 has failed. Specifically, the control unit 17 transmits state information representing each of a flight speed, a flight altitude, and a flight direction of the flight mechanism 15 to the management device 200.

[Configuration of Management Device 200]

Figure 3:
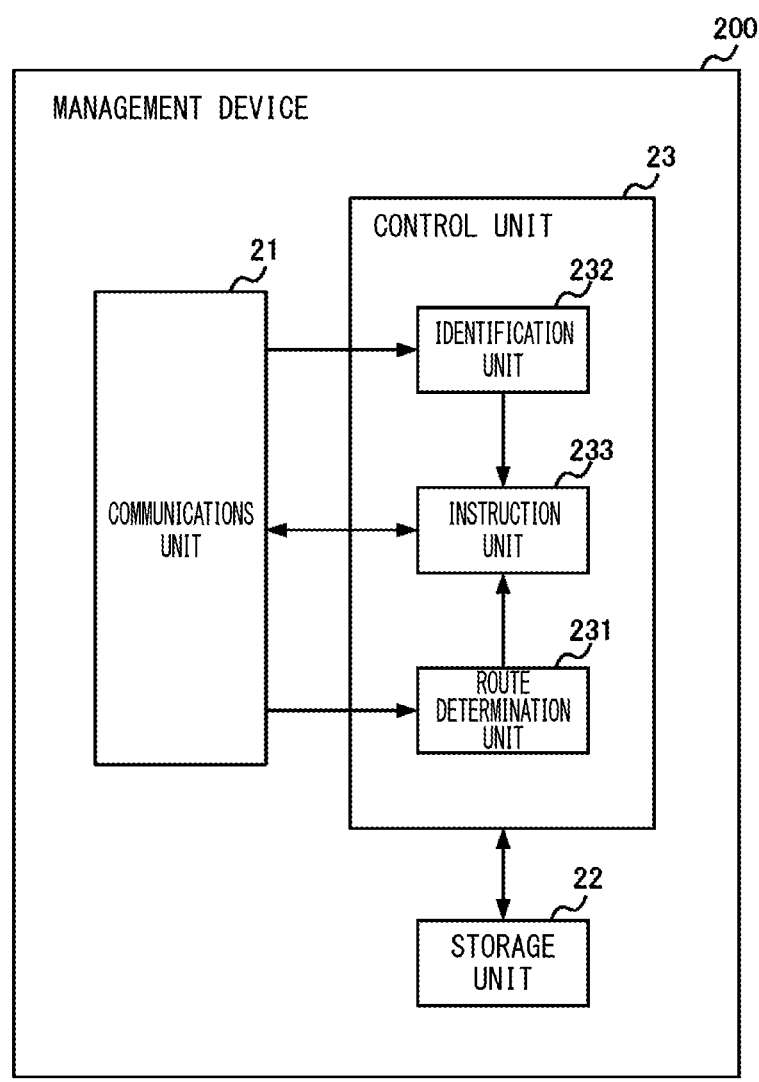
FIG. 3 is a block diagram showing a configuration of a management device according to the embodiment.

FIG. 3 is a diagram showing a configuration of the management device 200. The management device 200 includes a communication unit 21, a storage unit 22, and a control unit 23. The communication unit 21 is an interface for communicating with the flying device 100 via the network N and the base station 300. The storage unit 22 is a storage medium including a ROM, a RAM, and the like. The storage unit 22 stores a program to be executed by the control unit 23. The control unit 23 is, for example, a CPU. The control unit 23 functions as a route determination unit 231, an identification unit 232, and an instruction unit 233 by executing the program stored in the storage unit 22.

The route determination unit 231 determines a photography route along which the flying device 100 performs photography. For example, the route determination unit 231 determines the photography route on the basis of input information input by a manager using a mouse or an operation key (not shown). The input information is, for example, information representing the latitude/longitude on a boundary line of the inspection range R on the road H.

The route determination unit 231 may determine the photography route on the basis of disaster information acquired from an external device. For example, the external device is a server installed in an information provision agency such as the meteorological agency. The disaster information is, for example, information representing that an earthquake or the like has occurred. When disaster information representing the occurrence of an earthquake has been received, the route determination unit 231 determines the photography route of the flying device 100 so that a specific portion of the road required to be particularly inspected during the earthquake is photographed. The specific portion is, for example, a pillar that supports an elevated structure of the road H when the road H is an elevated road.

Also, when disaster information representing the occurrence of an earthquake with a predetermined seismic intensity or higher has been received or when detection information representing the detection of an earthquake with a predetermined seismic intensity or higher from a seismic intensity sensor mounted on the road H has been received, the route determination unit 231 may determine the photography route of the flying device 100 so that a specific portion is photographed. Those skilled in the art can set the predetermined seismic intensity as the seismic intensity required to inspect the road H. According to such a configuration, the route determination unit 231 can determine an appropriate photography route for inspecting the road H in accordance with a type of disaster such as an earthquake.

A time period in which the flying device 100 can fly in the inspection range R of the road H may be determined according to regulations or the like. In this case, the manager pre-stores the time period in which the flying device 100 can fly in the inspection range R in the storage unit 22. The route determination unit 231 may determine the photography route on the basis of an available flight time period of the inspection range R stored in the storage unit 16. For example, when an available flight time period in the inspection range R is from 15:00 PM to 17:00 PM, the route determination unit 231 determines the photography route so that the photography starts after 15:00 PM and the photography ends before 17:00 PM.

The identification unit 232 identifies a stop position where the first flying device 100a has stopped the photography so that the second flying device 100b is allowed to take over the photography when the first flying device 100a has stopped the photography of the road H. When a stop notification has been acquired from the first flying device 100a, the identification unit 232 identifies the stop position of the photography by the first flying device 100a on the basis of stop position information acquired in association with the stop notification. For example, the identification unit 232 identifies a position represented by the acquired stop position information as the stop position of the first flying device 100a. The identification unit 232 identifies a position of the photography route which is a predetermined distance ahead of the position represented by the acquired stop position information as the stop position so that a section where the photography is not performed near the position represented by the stop position information does not occur. The predetermined distance is, for example, a distance greater than or equal to an interval at which the first flying device 100a performs the photography.

The identification unit 232 acquires flight position information representing the position of the first flying device at predetermined time intervals. The predetermined time interval is, for example, 5 seconds or less or 1 second or less. When communication with the first flying device 100a is not possible, the identification unit 232 estimates that a normal photography operation has been performed up to a position where the flight position information of the first flying device 100a has been received last in the photography route. Therefore, when the flight position information cannot be acquired for a predetermined time period or longer, the identification unit 232 identifies a position within a predetermined range from the position represented by the flight position information acquired at last as the stop position.

The above-described predetermined time period is set to be longer than a delay that can normally occur when the identification unit 232 acquires the flight position information transmitted by the first flying device 100a. The predetermined range is, for example, a range of a distance greater than or equal to a magnitude of a GPS error on the basis of a position represented by the flight position information acquired at last. According to such a configuration, the identification unit 232 can identify the stop position even if the first flying device 100a does not transmit the stop notification or the stop position information to the management device 200 due to a failure or the like.

The identification unit 232 may identify a position where the flying device 100a stops the photography on the basis of information other than the stop notification received from the first flying device 100a. For example, the identification unit 232 acquires state information representing a state of the first flying device 100a and estimates the stop position on the basis of the state information. The identification unit 232 determines whether or not the acquired state information represents a failure of the first flying device 100a to estimate the stop position. For example, the identification unit 232 determines that the flying device 100a has failed when the acquired state information represents that a flight altitude of the first flying device 100a in flight is lower than a threshold value. This threshold value is, for example, a value representing a flight altitude required for a safe flight. The identification unit 232 identifies a flight position of the first flying device 100a at a point in time when it is determined that the state information represents that the first flying device 100a has failed as the stop position.

The identification unit 232 may identify the stop position by acquiring a scheduled stop position, which is a position where the first flying device 100a is scheduled to end the photography, from the first flying device 100a. Specifically, the identification unit 232 may previously identify the scheduled stop position acquired from the first flying device 100a as the stop position of the first flying device 100a. The identification unit 232 notifies the instruction unit 233 of the identified stop position.

The instruction unit 233 instructs the first flying device 100a to start the photography on the photography route determined by the route determination unit 231 via the communication unit 21. The instruction unit 233 selects the first flying device 100a on the basis of the photography route determined by the route determination unit 231 when instruction information for issuing a photography instruction has been acquired from an operation terminal of the manager. The instruction unit 233 selects a flying device, which is located within a predetermined distance from the photography route determined by the route determination unit 231 and which has a specification for enabling a flight to be performed along the photography route, as the first flying device 100a. The predetermined distance is, for example, 5 kilometers. For example, when the photography route includes a place where a wind is strong such as a place between buildings, the instruction unit 233 selects a flying device having a specification for enabling a flight along the photography route without being swept away by the wind as the first flying device 100a.

When inspection starts, the instruction unit 233 first transmits instruction information for issuing an instruction for starting the photography and photography route information representing the photography route determined by the route determination unit 231 to the first flying device 100a. The storage unit 22 may store the photography route information, or may delete the photography route information, after the transmission of the photography route information by the instruction unit 233.

When the identification unit 232 has identified the stop position, the instruction unit 233 instructs the second flying device 100b, which is different from the first flying device 100a, to start the photography on the photography route from the stop position. For example, when the instruction unit 233 selects the first flying device 100a as the flying device to be used with the highest priority, the instruction unit 233 selects the second flying device 100b as the flying device to be used with the second highest priority. The instruction unit 233 reserves the second flying device 100b under an assumption of a case in which the first flying device 100a stops the photography. The reserved second flying device 100b is on standby in a state in which flight preparation is made with the remaining amount of battery power sufficient for a flight along the photography route while the first flying device 100a is performing the photography of the road H.

Also, the instruction unit 233 may select a flying device that satisfies the following conditions (1) to (4) as the second flying device 100b when the first flying device 100a has stopped the photography. The following conditions (1) to (4) include:

(1) A condition in which the remaining amount of battery power is sufficient for a flight along the photography route after the stop position identified by the identification unit 232;

(2) A condition in which flight preparation is completed;

(3) A condition in which the flying device to be selected is located within a predetermined distance from the stop position identified by the identification unit 232; and (4) A condition in which the flying device to be selected has the same specifications as those of the first flying device 100a or specifications required to execute the photography of an instruction by the instruction unit 233.

The predetermined distance of the condition (3) is, for example, 5 kilometers.

The instruction unit 233 transmits instruction information for issuing an instruction for starting the photography when the identification unit 232 has identified the stop position and photography route information representing a route after the stop position among photography routes determined by the route determination unit 231 to the second flying device 100b.

According to such a configuration, the instruction unit 233 can instruct the second flying device 100b to start the photography before the first flying device 100a stops the photography. Therefore, the instruction unit 233 can curb temporary interruption of the photography due to stopping of the photography by the first flying device 100a in the middle of the photography route or shorten an interruption time period in which the photography is temporarily interrupted.

When the photography route information is deleted from the storage unit 22 after the photography route information is transmitted, the instruction unit 233 may acquire the photography route information representing the photography route after the stop position from the first flying device 100a. In this case, the instruction unit 233 transmits the photography route information acquired from the first flying device 100a to the second flying device 100b.

When the identification unit 232 determines that state information represents a failure of the first flying device 100a, the instruction unit 233 instructs the first flying device 100a to stop the photography. Also, the instruction unit 233 instructs the second flying device 100b to start the photography. When the identification unit 232 determines that the state information represents the failure of the first flying device 100a, the instruction unit 233 outputs end instruction information for issuing an instruction for immediately stopping the photography to the first flying device 100a. The instruction unit 233 transmits instruction information for issuing an instruction for starting the photography and photography route information representing a photography route after the stop position identified by the identification unit 232 to the second flying device 100b.

According to such a configuration, the instruction unit 233 can cause the second flying device 100b to start the photography when the identification unit 232 determines that the first flying device 100a has failed. Thus, the instruction unit 233 can curb the delay of the photography due to the failure of the first flying device 100a.

[Operation Sequence of Photography System S]

Figure 4:
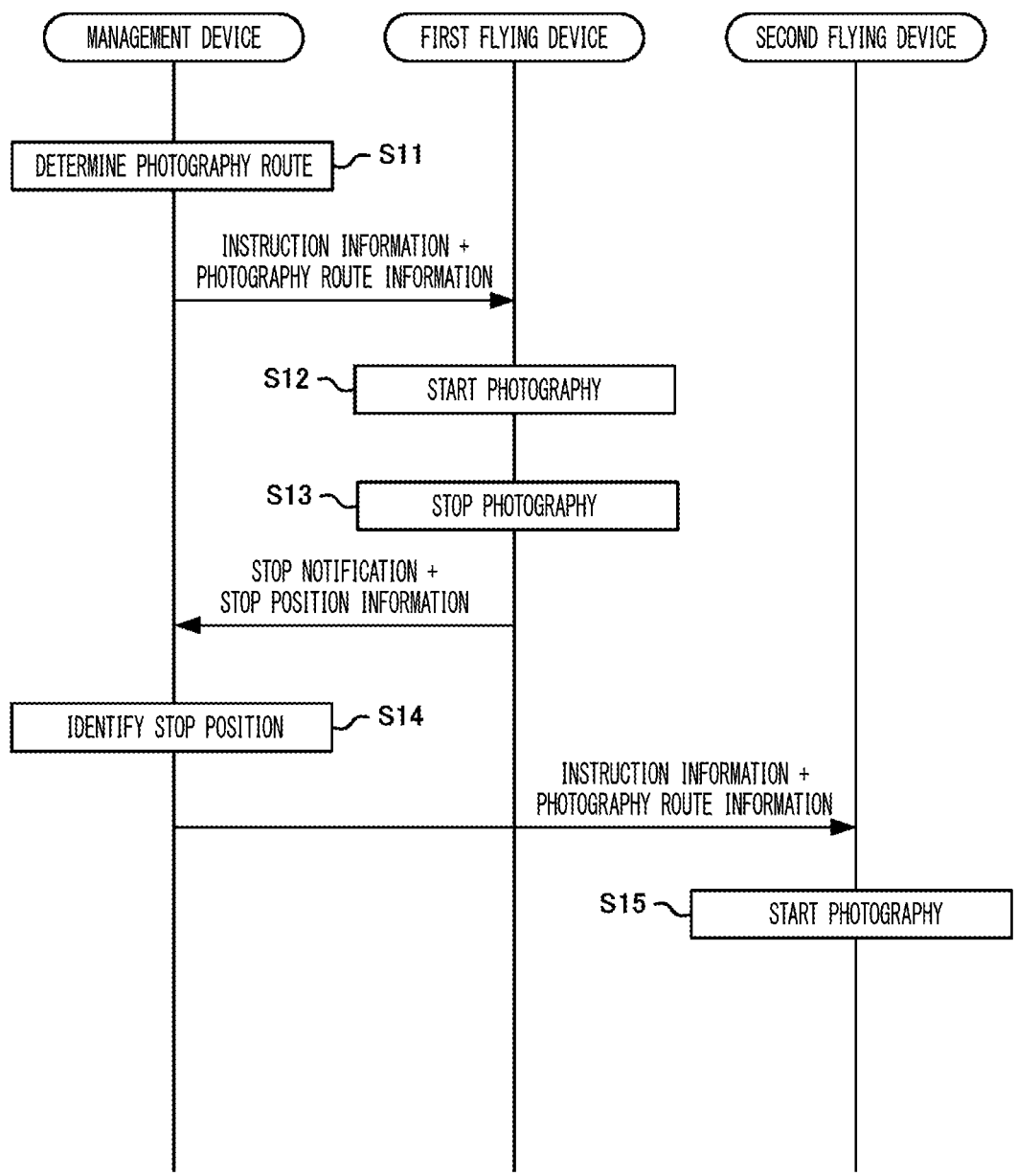
FIG. 4 is a sequence diagram showing an example of an operation at the time of photography of a road by the photographing system according to the first embodiment.

FIG. 4 is a sequence diagram showing an example of an operation at the time of photography of the road H by the photography system S of the first embodiment. This processing procedure is started when the management device 200 receives input information input by a user to set the inspection range R of the road H as a photography target. First, the route determination unit 231 determines a photography route for the first flying device 100a to perform the photography on the basis of the input information (S11). The instruction unit 233 transmits instruction information for issuing an instruction for starting the photography and photography route information representing a photography route determined by the route determination unit 231 to the first flying device 100a. The first flying device 100a moves from a standby place to the photography route represented by the photography route information received from the management device 200. The flying device 100a starts the photography of the road H at a point in time when the flying device 100*a* has reached a position on the photography route where the photography is started (S12).

The control unit 17 of the flying device 100*a* stops the photography when a lack of the remaining amount of battery power has been detected (S13). The control unit 17 of the flying device 100*a* transmits a stop notification and stop position information, which are associated with each other, to the management device 200. The identification unit 232 identifies a stop position of the photography by the first flying device 100*a* on the basis of the acquired stop position information (S14). The instruction unit 233 transmits instruction information for issuing an instruction for starting the photography and photography route information representing a route after the stop position among photography routes determined by the route determination unit 231 to the second flying device 100*b*. The control unit 17 of the second flying device 100*b* moves from a standby position to the stop position and starts the photography of the road H on the photography route when the second flying device 100*b* has reached the stop position (S15).

[Effect of Photography System S]

According to the present embodiment, when the identification unit 232 identifies a position where the first flying device 100*a* has stopped the photography, the instruction unit 233 instructs the second flying device 100*b* to start the photography from the stop position on the photography route. Therefore, the instruction unit 233 can cause the photography to be continued even if the remaining amount of battery power of the first flying device 100*a* is insufficient before the photography is completed and photography of a large area is possible as compared with a case in which only one flying device 100 performs the photography.

Second Embodiment

In a second embodiment, an example in which an identification unit 232 estimates a time at which a first flying device 100*a* will stop photography and an instruction unit 233 instructs a second flying device 100*b* to start photography before the time estimated by the identification unit 232 will be described. The identification unit 232 of the second embodiment acquires flight position information representing a flight position of the first flying device 100*a* and the remaining amount of battery power of the first flying device 100*a* from the first flying device 100*a*. The identification unit 232 calculates the electric power required for the first flying device to return from the flight position to a predetermined standby position on the basis of the acquired flight position information.

The identification unit 232 estimates a time at which the first flying device 100*a* will stop the photography on the basis of the calculated electric power and the remaining amount of battery power acquired from the first flying device 100*a*. In more detail, the identification unit 232 calculates a flight time period in which the first flying device 100*a* can continue the photography of the road H in a state in which the electric power required to return to the predetermined standby position is ensured. As an example, the identification unit 232 calculates a flight time period on the basis of a statistical value of power consumption within the latest predetermined period of the first flying device 100*a*. The predetermined period is, for example, 5 minutes. The identification unit 232 estimates a time at which the photography will be stopped by adding the calculated flight time period to a current time. According to such a configuration, the identification unit 232 can accurately estimate the time at which the first flying device 100*a* stops the photography on the basis of the remaining amount of battery power acquired from the first flying device 100*a*.

The instruction unit 233 instructs the second flying device 100*b* to start the photography before the time estimated by the identification unit 232. The instruction unit 233 calculates a time at which the second flying device 100*b* is allowed to depart so that the second flying device 100*b* reaches a position where the first flying device 100*a* stops the photography before the time estimated by the identification unit 232.

The instruction unit 233 first acquires position information representing the position of the second flying device 100*b* to calculate the time at which the second flying device 100*b* is allowed to depart. The instruction unit 233 calculates a movement time period required for the second flying device 100*b* to reach the flight position of the first flying device 100*a* on the basis of a distance from the position of the second flying device 100*b* to the flight position of the first flying device 100*a*.

The instruction unit 233 determines a departure time required for the second flying device 100*b* to reach the flight position of the first flying device 100*a* before the time estimated by the identification unit 232 on the basis of the calculated movement time period. The instruction unit 233 notifies the second flying device 100*b* of the determined departure time. The instruction unit 233 instructs the second flying device 100*b* to start the photography before the time at which the first flying device 100*a* is predicted to stop the photography estimated by the identification unit 232. Thereby, the management device 200 can cause the photography by the second flying device 100*b* to be started at the time when the first flying device 100*a* is expected to stop the photography.

Also, the instruction unit 233 may instruct the second flying device 100*b* to start the photography after the time estimated by the identification unit 232 in consideration of a possibility of a collision between the first flying device 100*a* and the second flying device 100*b*. For example, the instruction unit 233 may calculate a time at which the second flying device 100*b* is allowed to depart so that the second flying device 100*b* reaches the position where the first flying device 100*a* stops the photography after a predetermined time period from the time estimated by the identification unit 232. The predetermined time period is, for example, 5 minutes.

The instruction unit 233 may determine that the first flying device 100*a* is allowed to end the photography on the basis of electric power required for the first flying device 100*a* to return to a predetermined standby position and the remaining amount of battery power. The instruction unit 233 compares the electric power required for the first flying device 100*a* to return to the predetermined standby position after the first flying device 100*a* completes the photography of all routes on the photography route with electric power capable of being supplied according to the remaining amount of battery power acquired from the first flying device 100*a*.

When it is determined that the electric power required for the first flying device 100*a* to return to the predetermined standby position after the first flying device 100*a* completes the photography of all routes on the photography route is greater than the electric power capable of being supplied according to the remaining amount of battery power, the instruction unit 233 determines that the first flying device 100*a* is allowed to end the photography at an end instruction position in the middle of the photography route. The end instruction position is, for example, a position at which the first flying device 100a will arrive before the time estimated by the identification unit 232 when the first flying device 100a stops the photography.

The instruction unit 233 instructs the first flying device 100a to end the photography at the end instruction position when it is determined that the first flying device 100a is allowed to end the photography. When it is determined that the first flying device 100a is allowed to end the photography, the instruction unit 233 instructs the second flying device 100b to start the photography at the end instruction position. Thereby, the management device 200 can cause the second flying device 100b to start the photography before a state in which the first flying device 100a cannot continue the photography is reached even if the first flying device 100a does not stop the photography autonomously.

[Operation Sequence of Second Embodiment]

Figure 5:
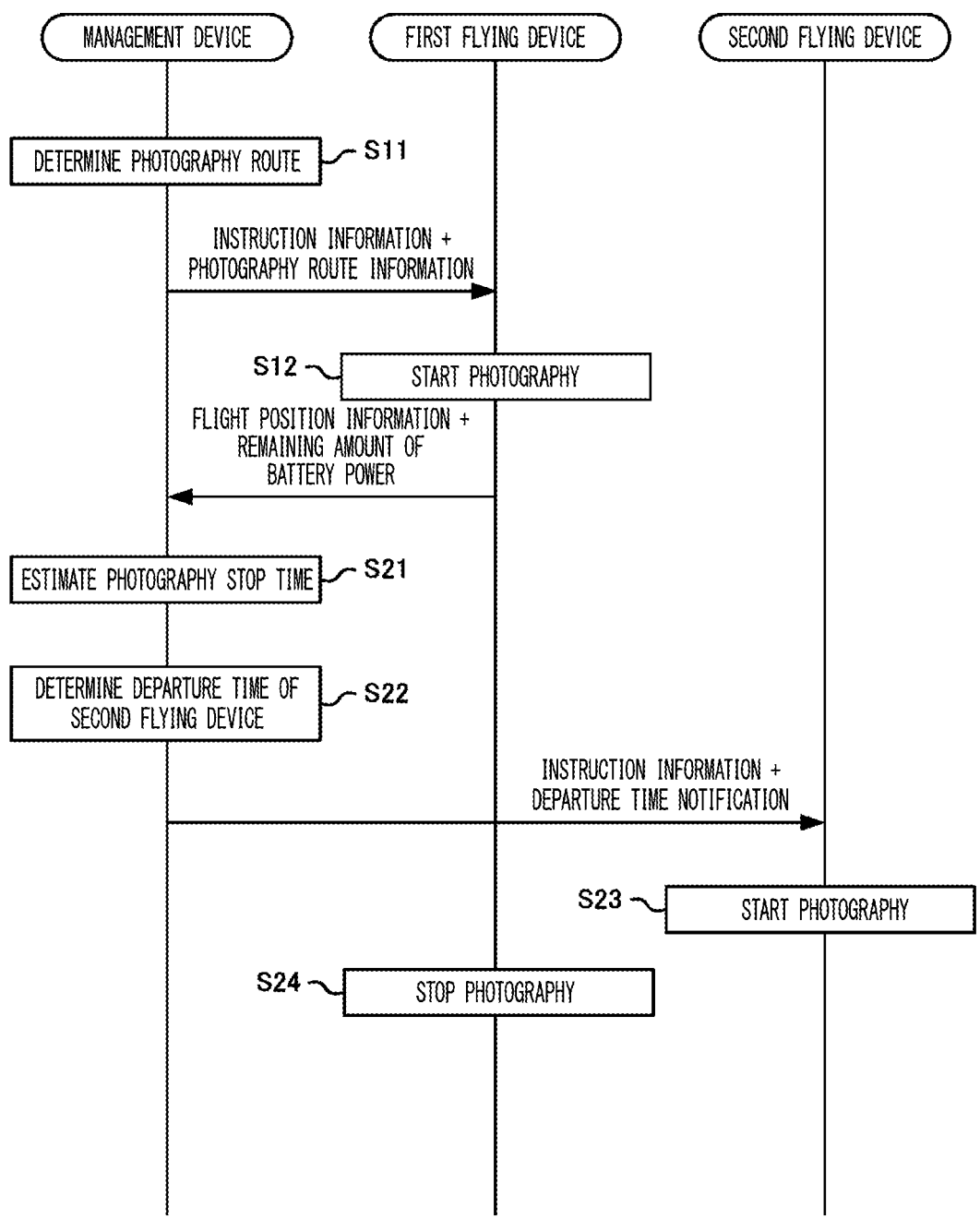
FIG. 5 is a sequence diagram showing an example of an operation at the time of photography of a road by a photography system according to a second embodiment.

FIG. 5 is a sequence diagram showing an example of an operation at the time of photography of the road H by the photography system S of the second embodiment.

Because the processing of S11 and S12 is the same as the processing in the first embodiment shown in FIG. 4, description thereof will be omitted.

The control unit 17 of the first flying device 100a sequentially transmits flight position information representing a position of the first flying device 100a and information representing the remaining amount of battery power to the management device 200 while the road H is being photographed. The identification unit 232 estimates a time at which the first flying device 100a will stop the photography on the basis of electric power required for the first flying device 100a to return to a predetermined standby position and the remaining amount of battery power acquired from the first flying device 100a (S21). The instruction unit 233 determines a departure time of the second flying device 100b required for the second flying device 100b to reach a flight position of the first flying device 100a before the time estimated by the identification unit 232 (S22).

The instruction unit 233 transmits instruction information for issuing an instruction for starting the photography before the time estimated by the identification unit 232 when the first flying device 100a stops the photography and a departure time notification for providing a notification of the determined departure time to the second flying device 100b. The control unit 17 of the second flying device 100b moves from a standby position to the position where the first flying device 100a stops the photography. The control unit 17 of the second flying device 100b starts the photography of the road H on a photography route at a point in time when the first flying device 100a reaches a position where the photography is stopped (S23). The first flying device 100a stops the photography according to the time estimated by the identification unit 232 when the first flying device 100a stops the photography (S24) and returns to the standby position.

According to the second embodiment, the instruction unit 233 instructs the second flying device 100b to start the photography before the time estimated by the identification unit 232. Thus, it is possible to curb the occurrence of a time period in which no photography is performed after the first flying device 100a stops the photography and before the second flying device 100b starts the photography.

Although the present invention has been described above using the embodiments, the technical scope of the present invention is not limited to the scope described in the above-described embodiments and various modifications and changes are possible within the scope of the subject matter thereof. For example, the specific embodiment of the distribution/integration of the devices is not limited to the above-described embodiment and all or a part thereof can be configured to be functionally or physically distributed/integrated in any unit. Also, a new embodiment produced by any combination of a plurality of embodiments is also included in the embodiment of the present invention. The effect of the new embodiment produced by the combination has the effect of the original embodiment.

REFERENCE SIGNS LIST

11 Communication unit
12 Position sensor
13 Remaining battery power meter
14 Camera
15 Flight mechanism
16 Storage unit
17 Control unit
21 Communications unit
22 Storage unit
23 Control unit
100a First flying device
100b Second flying device
100c Third flying device
200 Management device
231 Route determination unit
232 Identification unit
233 Instruction unit
300 Base station

The invention claimed is:

1. A management device comprising:
a route determination unit configured to determine a photography route;
an instruction unit configured to instruct a first flying device to perform photography on the photography route; and
an identification unit configured to identify a stop position of the photography by the first flying device, wherein
when the identification unit has identified the stop position, the instruction unit is configured to instruct a second flying device, which is different from the first flying device, to start the photography on the photography route from the stop position.

2. The management device according to claim 1, wherein the identification unit is configured to identify the stop position on the basis of stop position information representing the stop position acquired from the first flying device that has stopped the photography.

3. The management device according to claim 1, wherein the identification unit is configured to acquire flight position information representing a position of the first flying device at predetermined time intervals and identify a position within a predetermined range from a position represented by the flight position information that has been acquired last as the stop position when the flight position information cannot be acquired for a predetermined time period or longer.

4. The management device according to claim 1, wherein:
the identification unit is configured to estimate a time at which the first flying device will stop the photography; and
the instruction unit is configured to instruct the second flying device to start the photography before the time estimated by the identification unit.

5. The management device according to claim 4, wherein the instruction unit is configured to determine a departure time required for the second flying device to reach a flight position of the first flying device before the time estimated by the identification unit on the basis of a distance from a position of the second flying device to the flight position of the first flying device and notifies the second flying device of the determined departure time.

6. The management device according to claim 4, wherein the identification unit is configured to acquire the remaining amount of battery power of the first flying device and estimate a time at which the first flying device will stop the photography on the basis of electric power required for the first flying device to return to a predetermined position and the remaining amount of battery power.

7. The management device according to claim 1, wherein:
the identification unit is configured to acquire the remaining amount of battery power of the first flying device; and
when it is determined that the first flying device is allowed to end the photography on the basis of electric power required for the first flying device to return to a predetermined position and the remaining amount of battery power, the instruction unit is configured to instruct the first flying device to end the photography and instruct the second flying device to start the photography.

8. The management device according to claim 1, wherein:
the identification unit is configured to acquire state information representing a state of the first flying device and identify a flight position of the first flying device at a point in time at which the state information is determined to represent a failure of the first flying device as the stop position; and
when the identification unit determines that the state information represents the failure of the first flying device, the instruction unit is configured to instruct the first flying device to stop the photography and instruct the second flying device to start the photography.

9. The management device according to claim 1, wherein:
the identification unit is configured to identify the stop position by acquiring a scheduled stop position, which is a position where the first flying device is scheduled to end the photography, from the first flying device; and
the instruction unit is configured to instruct the second flying device to start the photography from the scheduled stop position when the identification unit has acquired the scheduled stop position.

10. The management device according to claim 1, wherein the route determination unit is configured to determine the photography route on the basis of externally acquired disaster information.

11. A flying device management method comprising:
determining, by a computer, a photography route;
instructing, by the computer, a first flying device to perform photography on the photography route;
identifying, by the computer, a stop position of the photography by the first flying device; and
instructing, by the computer, a second flying device, which is different from the first flying device, to start the photography on the photography route from the stop position when the stop position has been identified.

* * * * *